G. O. GRIDLEY.
METAL TURNING TOOL.
APPLICATION FILED DEC. 7, 1915.
1,187,618.
Patented June 20, 1916.
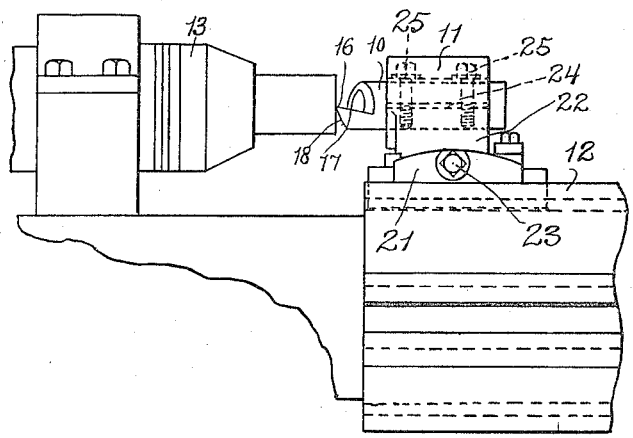
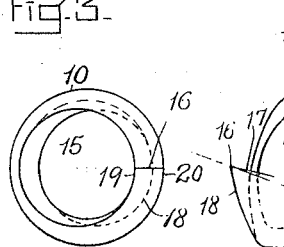
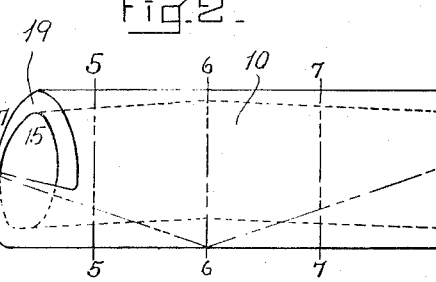
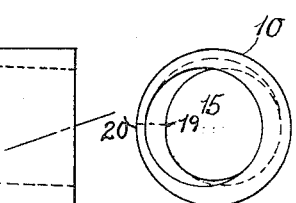
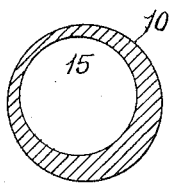
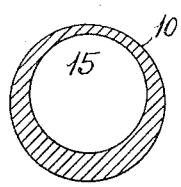
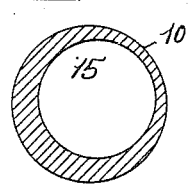
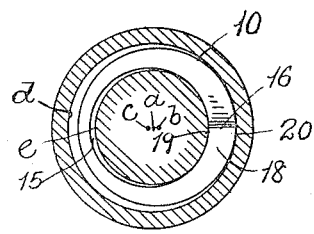
INVENTOR
G. O. Gridley
by
Attys.

UNITED STATES PATENT OFFICE.

GEORGE O. GRIDLEY, OF WINDSOR, VERMONT, ASSIGNOR TO THE NATIONAL-ACME MANUFACTURING COMPANY, OF CLEVELAND, OHIO, A CORPORATION OF OHIO.

METAL-TURNING TOOL.

1,187,618.  Specification of Letters Patent.  Patented June 20, 1916.

Application filed December 7, 1915. Serial No. 65,524.

*To all whom it may concern:*

Be it known that I, GEORGE O. GRIDLEY, a citizen of the United States, residing at Windsor, in the county of Windsor and State of Vermont, have invented new and useful Improvements in Metal-Turning Tools, of which the following is a specification.

This invention has relation to metal-turning tools, and more particularly to what are termed trepanning tools and which are used for cutting an annular groove in the stock, as for instance in the end of a bar held and rotated by a suitable work spindle.

On the accompanying drawing, Figure 1 shows a tool embodying the invention and a holder therefor. Fig. 2 shows the tool detached. Figs. 3 and 4 represent views of the opposite ends of the tool. Figs. 5, 6 and 7 represent cross sections on the lines 5—5, 6—6 and 7—7 of Fig. 2. Fig. 8 illustrates the action of the tool on the work.

The tool, which is illustrated on the drawings as one embodiment of the invention, is indicated as a whole at 10, and it is rigidly clamped in a holder 11 of any suitable form in which, however, it may be rotatively adjusted. The holder may be secured by any usual means upon a tool slide 12 which is fed toward and from a rotatable work holder or spindle 13.

The tool has a cylindrical exterior and is of any desired length. It is tubular and its bore 15 is helical, so that a cross section at any point along its length will show a circular outer wall, and a circular but eccentric inner wall, as disclosed for example in Figs. 5, 6 and 7. This will be understood by considering that the axis of the bore winds about the axis of the periphery of the tool in the form of a helix of slight pitch. As a result of this construction, it will be seen that the wall of the tube is thick and thin at diametrically opposite points, and that the thick portion extends helically lengthwise of the tube. The cutting edge 16 is always formed in the thick portion of the wall and is radial of the axes of both the outer and inner surfaces of the tube. This edge is formed by grinding away one end of the tube so as to leave a top face 17 and a front face 18 at the desired angle to each other. The entire front end 19 of the tool may be helical, so as to terminate in the front face 18, thereby giving sufficient space for the emergence of the cuttings from the helical wall of the groove formed in the work.

In operation, in order that there may be sufficient clearance on the sides of the cutting nose formed by the faces 17 and 18 and the curved inner and outer sides 19 and 20, the tool is set or adjusted, so that the axis of the bore and the axis of the exterior wall are on opposite sides of the work axis. This arrangement is shown in Fig. 8, in which the work axis is indicated at $a$, the axis of the tool as a whole at $b$, and the axis of the bore at $c$. In this figure, the walls of the groove being cut in the work are indicated at $d$ and $e$, and it will be seen that there is a clearance between these walls and the curved side faces of the cutting nose of the tool.

The tool holder 11 is preferably of the "set over" type, and it may consist of a flat base 21 having provisions for attachment to a tool slide or to the turret of a lathe, and a standard 22 gibbed to slide transversely on said base. It is adjusted by a screw bar 23 journaled in a socket formed in a flange on the end of said base. Said standard has a cylindrical socket of proper dimensions to receive the tool, and is slit as at 24 to form clamp members, said members being forced together to clamp the tool by screws 25. With this construction the tool may be bodily adjusted transversely of the axis of the work, or it may be rotatively adjusted in its holder and then clamped in place.

Having thus explained the nature of my said invention, and described a way of making and using the same, although without attempting to set forth all of the forms in which it may be made or all of the modes of its use, what I claim is:

1. A trepanning tool consisting of a tube having an eccentric bore, and having a substantially radial cutting edge formed in the thicker portion thereof.

2. A trepanning tool consisting of a tube having an eccentric bore, and having a nose at its end terminating in a cutting edge extending across the thickest portion of the tube.

3. A trepanning tool consisting of a tube having an eccentric bore, and having a nose at its end formed with an end face and a top face terminating in a cutting edge extending across the thickest portion of the tube.

4. A trepanning tool consisting of a tube having an eccentric bore, one end of said tube being helical and terminating in a nose having an end face and a top face forming at their intersection a cutting edge, which is not less in length than the thick portion of the wall of the tube.

5. A trepanning tool consisting of a tube having an eccentric helical bore, and a cutting edge formed in the thick wall of the tube.

6. A trepanning tool consisting of a tube having an eccentric helical bore, and having at one end a nose formed in the thick portion of the tube, said nose having an end face and an inclined top face terminating in a substantially radial cutting edge.

7. The combination with a rotatable work-carrying spindle, of a cutting tool consisting of a tube having an eccentric bore circular in cross section, and a cutting edge formed in the thick portion of the tube, the axis of the work spindle being located between the axis of the tool and the axis of the bore thereof.

In testimony whereof I have affixed my signature.

GEORGE O. GRIDLEY.